Oct. 7, 1924.  1,510,846
S. HOFMANN
FAUCET WASHER AND ATTACHING MEANS
Filed Dec. 6, 1923
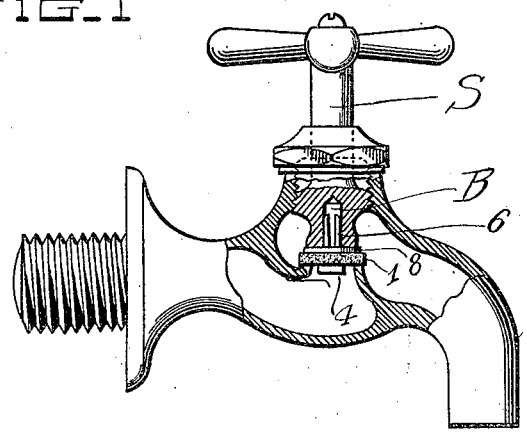
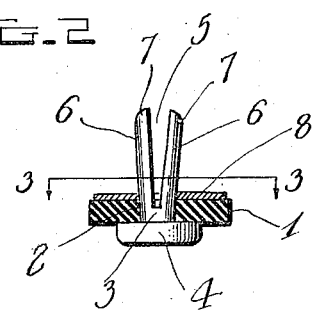
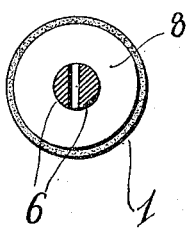
Inventor
S. HOFMANN
By H. R. Willson & Co.
Attorneys
Witness
S. Hill Patented Oct. 7, 1924.

1,510,846

UNITED STATES PATENT OFFICE.

STEPHEN HOFMANN, OF BROOKLYN, NEW YORK.

FAUCET WASHER AND ATTACHING MEANS.

Application filed December 6, 1923. Serial No. 678,992.

*To all whom it may concern:*

Be it known that I, STEPHEN HOFMANN, a citizen of the United States, residing at Brooklyn, in the county of Kings and State of New York, have invented certain new and useful Improvements in Faucet Washers and Attaching Means; and I do declare the following to be a full, clear, and exact description of the invention, such as will enable others skilled in the art to which it appertains to make and use the same.

My invention relates to washers for use on faucets and the principal object is to provide novel attaching means for such washers which will eliminate the use of the usual washer attaching screws and may be employed even though the threads may have stripped in the usual screw bore of the faucet stem.

Another object is to provide a construction of such a nature as to permit the stem and washer to turn relatively, thus preventing the usual injurious scraping of the washer on its seat, as the faucet is closed.

A further aim is to incorporate the faucet washer and the improved attaching means in a single article of manufacture, although a still further object is to provide the attaching means in the form of a split, laterally expanded, headed pin which may, if desired, be sold separately and used in connection with any ordinary faucet washer, by the purchaser, instead of using the usual attaching screw.

With the foregoing in view, the invention resides in the novel subject matter hereinafter described and claimed, the description being supplemented by the accompanying drawing.

Figure 1 is a sectional view partly in elevation showing a faucet equipped with the invention.

Figure 2 is an enlarged sectional view of a faucet washer showing the improved attaching means in elevation.

Figure 3 is a horizontal sectional view on line 3—3 of Fig. 2.

In the drawing above briefly described, the numeral 1 designates a faucet washer formed of fibre or any other desired material, said washer having the usual central opening 2. A metal pin 3 is passed through this opening and is provided with a head 4 which contacts with the lower side of the washer 1, the pin being longitudinally split as indicated at 5, above the washer, to provide a pair of resilient arms 6 for snug frictional reception in the usual screw bore B of the faucet stem S, even though the threads may have stripped from said bore, it being understood that the pin is laterally expanded at opposite sides of the split 5 to cause the arms 6 to be placed under tension by their insertion into the screw bore. To facilitate this insertion, the upper ends of these arms are preferably beveled or rounded as indicated at 7.

Attention may here be directed to the fact that in addition to performing the function above specified, lateral expanding of the pin 3 prevents it from dropping out of the washer opening and consequently will retain the washer and the attaching means, assembled as a single unit. In the preferred form of construction, not only is the washer 1 held upon the pin 3 by the lateral expansion of the latter, but a metal washer 8 is preferably provided on the upper side of the washer 1 to be similarly held in place by the pin, said washer 8 being formed with a central opening through which the pin passes.

The improved article, as manufactured and placed on sale, preferably consists of the two washers 1 and 8 and the pin 3, assembled as shown in Fig. 2, but it will be obvious that in some instances the washer 8 might be omitted. Also, it will be seen that the pin 3 might be sold separately from any washer and used in connection with an ordinary faucet washer, for securing the same in place, instead of using the ordinary screw. The use of the washer 8 is preferable as it forms an anti-friction bearing between the stem S and the washer 1 and hence the stem has no tendency to turn the washer and scrape it upon its seat, with the usual injurious results.

It will be seen from the foregoing that I have provided an exceptionally simple and inexpensive, yet an unusually desirable article, and while this article preferably is of the construction disclosed, it is to be understood that this disclosure is principally for illustrative purposes and that within the scope of the invention as claimed, numerous forms of construction may be followed.

I claim:

1. An article of manufacture comprising a faucet washer having the usual central opening, and a pin passing through said opening, and of greater length than the thickness of the washer, said pin having a head at one side of the washer and being longitudinally split at the other side thereof and expanded to a greater size than said opening to form spring arms, said arms retaining the pin in the washer opening prior to application of the article to a faucet, and being adapted also for frictional reception in the usual screw bore of a faucet stem to connect the washer to the latter.

2. An article of manufacture comprising a faucet washer having the usual central opening, and a pin passing through said opening, said pin having a head at the lower side of the washer and being longitudinally split at the other side thereof to [be dis]posed below the upper side of said [washer] to form spring arms adapted for recep[tion] in the usual screw receiving bore of a faucet stem, and a metal stem-engaging washer contacting with the upper side of the faucet washer and having an opening through which said spring arms extend, the latter being spread to a size greater than the openings in said washers and acting to hold both washers in place on the pin before application of the article to a faucet.

In testimony whereof I have hereunto affixed my signature.

STEPHEN HOFMANN.